United States Patent [19]

Martin

[11] Patent Number: 5,488,596
[45] Date of Patent: Jan. 30, 1996

[54] CLEANING DEVICE THAT DOES NOT ENGAGE THE DISC DRIVE SPINDLE

[76] Inventor: Robert D. Martin, 13 Wheeler Dam Rd., Salem, N.H. 03079

[21] Appl. No.: 18,114

[22] Filed: Feb. 17, 1993

[51] Int. Cl.⁶ ................................................. G11B 15/18
[52] U.S. Cl. ................................................. 369/71
[58] Field of Search .................... 360/128, 133, 360/135; 369/71, 292; 15/DIG. 12, 250.001, 250.22; 359/507, 813, 814, 508

[56] References Cited

U.S. PATENT DOCUMENTS

| | | | |
|---|---|---|---|
| 4,374,404 | 2/1983 | Davis | 360/128 |
| 4,375,658 | 3/1983 | Martinelli | 360/128 |
| 4,377,831 | 3/1983 | Davis et al. | 360/128 |
| 4,490,765 | 12/1984 | Nakamats | 360/133 |
| 4,498,114 | 2/1985 | Davis | 360/128 |
| 4,499,516 | 2/1985 | Purdy et al. | 360/128 |
| 4,503,473 | 3/1985 | Eyler et al. | 360/128 |
| 4,516,176 | 5/1985 | Street | 360/75 |
| 4,520,470 | 5/1985 | d'Alayer de Costemore d'Arc | 360/72 |
| 4,558,386 | 12/1985 | Kara | 360/128 |
| 4,586,100 | 4/1986 | Howe et al. | 360/128 |
| 4,589,044 | 5/1986 | Lindberg | 360/128 |
| 4,622,617 | 11/1986 | Fritsch | 360/128 |
| 4,628,388 | 12/1986 | Kawabe | 360/128 |
| 4,630,157 | 12/1986 | Bond | 360/128 |
| 4,639,813 | 1/1987 | Uno | 360/128 |
| 4,663,686 | 5/1987 | Freeman et al. | 360/128 |
| 4,682,257 | 7/1987 | Neuman | 360/128 |
| 4,734,815 | 3/1988 | Naganawa et al. | 360/128 |
| 4,754,356 | 6/1988 | Cooper | 360/128 |
| 4,791,516 | 12/1988 | Seto | 360/133 |
| 4,817,078 | 3/1989 | Iwata | 369/71 |
| 4,868,699 | 9/1989 | Kingsbury et al. | 360/128 |
| 4,868,700 | 9/1989 | Fritsch | 360/128 |
| 4,870,636 | 9/1989 | Yamamoto | 369/292 |
| 4,916,564 | 4/1990 | Fritsch | 360/128 |
| 5,088,083 | 2/1992 | Olson | 369/71 |
| 5,117,411 | 5/1992 | Nakagawa | 369/72 |
| 5,150,268 | 9/1992 | Abe et al. | 360/128 |
| 5,235,485 | 8/1993 | Martin | 360/128 |

FOREIGN PATENT DOCUMENTS

| | | | |
|---|---|---|---|
| 0148580A1 | 11/1984 | European Pat. Off. . | |
| 0181422 | 5/1986 | European Pat. Off. . | |
| 0240290A3 | 3/1987 | European Pat. Off. . | |
| 90034872 | 7/1990 | Germany . | |
| 61-214238 | 9/1986 | Japan | 369/71 |
| 63-214976 | 9/1988 | Japan | 369/71 |
| 1-251483 | 10/1989 | Japan | 369/71 |
| 64-54274 | 9/1990 | Japan | 369/71 |
| 3-66081 | 3/1991 | Japan | 369/71 |
| 3-93077 | 4/1991 | Japan | 369/71 |
| 2225747A | 6/1990 | United Kingdom | 5/41 |

OTHER PUBLICATIONS

Patent Abstracts of Japan vol. 9, No. 163 (P-371)(1886) 9 Jul. 1985 & JP,A,60 040 537 (Matsushita) 2 Mar. 1985.
Research Disclosure, No. 327, Jul. 1991, Emsworth, GB p. 550, XP000258780.
IBM Technical Disclosure Bulletin, vol. 25, No. 7A, Dec. 1982 p. 3174.
Translation of JP Application 61-214238, published Sep. 24, 1986, Disc Player Cleaning Apparatus.

*Primary Examiner*—A. J. Heinz
*Assistant Examiner*—David D. Davis
*Attorney, Agent, or Firm*—Wolf, Greenfield & Sacks

[57] ABSTRACT

A tool for cleaning a laser lens of an optical disc drive unit. The tool includes a rigid, round member which is constructed and arranged for insertion into the receiving area of an optical disc drive unit. The member has a central aperture that allows clearance for the drive spindle of the optical disc drive unit, permitting the drive spindle to rotate freely after the optical disc drive unit has been activated. A cleaning pad is attached to the bottom surface of the member. Risers extending from the member seat on the sliding tray of a disc drive unit, ensuring that the cleaning pad contacts the lens at its upper most path of travel.

10 Claims, 4 Drawing Sheets

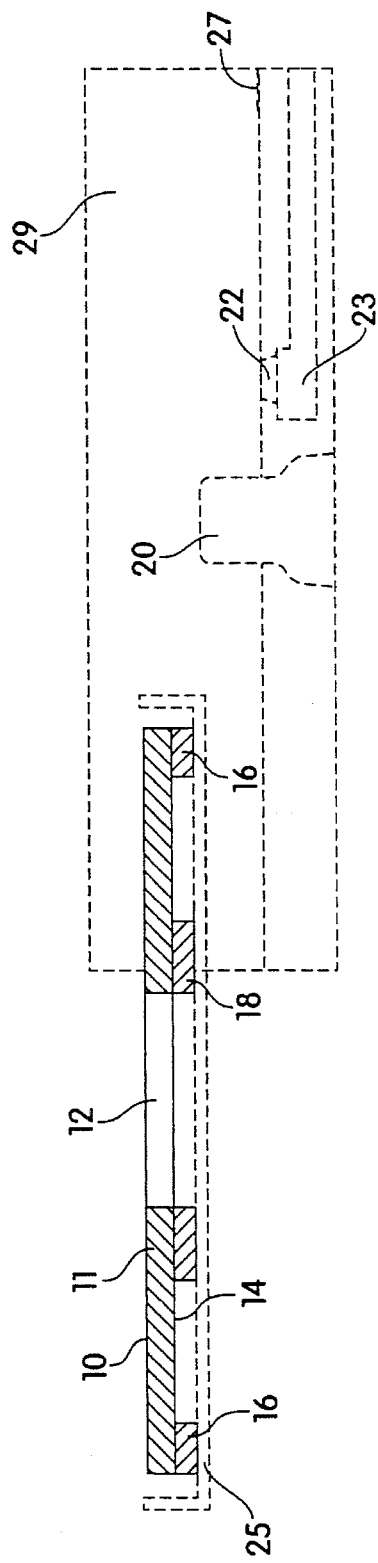
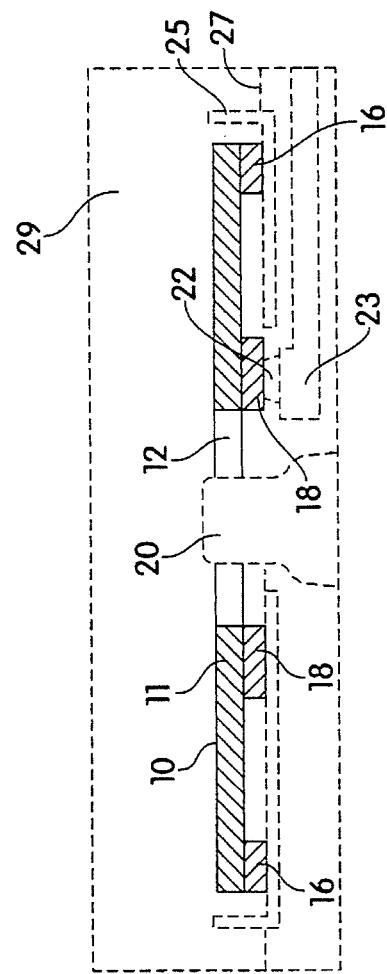
Fig. 3
Fig. 4

5,488,596

CLEANING DEVICE THAT DOES NOT ENGAGE THE DISC DRIVE SPINDLE

FIELD OF THE INVENTION

This invention relates to a cleaning device, and more particularly, to a device for cleaning a laser lens of an optical disc drive unit.

BACKGROUND OF THE INVENTION

A laser lens of an optical disc drive unit accumulates dust and debris and, therefore, requires periodic cleaning. One known device for cleaning an optical disc drive unit includes a round disc having cleaning bristles which extend from a bottom surface of the disc and a central aperture which is mated with a drive spindle of the optical disc drive to engage the disc and spindle together. The disc is reciprocally spun by the rotating spindle, moving the bristles across the surface of the lens to remove dust and debris.

This prior art cleaning tool may suffer from several disadvantages. The bristles may bend or break after being repeatedly rotated against the laser lens. Debris may build-up on the trailing surface of the lens which is not in the direction of rotation of the cleaning bristles. Further, the repeated rotation of the bristles against the lens may cause individual bristles to break free which can obstruct the laser beam emitted through the laser lens

SUMMARY OF THE INVENTION

The present invention provides an improved cleaning device for cleaning the laser lens of an optical disc drive unit or any other optical data reading, recording or playback device, including audio and video devices.

According to one embodiment of the invention, the cleaning device includes a substantially round, rigid plastic member having a central aperture which is larger than a drive spindle of an optical drive unit, providing sufficient radial clearance between the spindle and the member so that the cleaning device does not spin when the spindle is activated and rotates. A soft and sticky silicone gel pad for removing contaminants and dust from the laser lens is positioned about the aperture on the bottom surface of the member. A plurality of risers extend from the bottom surface of the member and seat on the sliding or receiving tray of the disc drive unit, providing clearance for the cleaning pad relative to the laser lens.

The cleaning member is seated onto the sliding tray and retracted into the receiving area of the optical drive unit. The drive spindle is activated and is deployed upwardly through the large central aperture. The rotating spindle does not engage the cleaning member and, consequently, the member does not spin but remains completely stationary. The laser lens is driven upwardly towards the cleaning member, contacting the sticky cleaning pad. The sticky surface of the soft silicone gel cleaning pad attracts and removes dirt and debris from the surface of the lens.

BRIEF DESCRIPTION OF THE DRAWING

The foregoing and other objects and advantages of the invention will be appreciated more fully from the following drawings in which:

FIG. 3 is a longitudinal cross-sectional view, partly in phantom, of the device of FIG. 1 placed on a slide tray common to optical disc drives;

FIG. 4 is a longitudinal cross-sectional view partly in phantom, of the device of FIG. 1 fully seated in a disc drive unit.

DESCRIPTION OF THE PREFERRED EMBODIMENT

Figure 1:
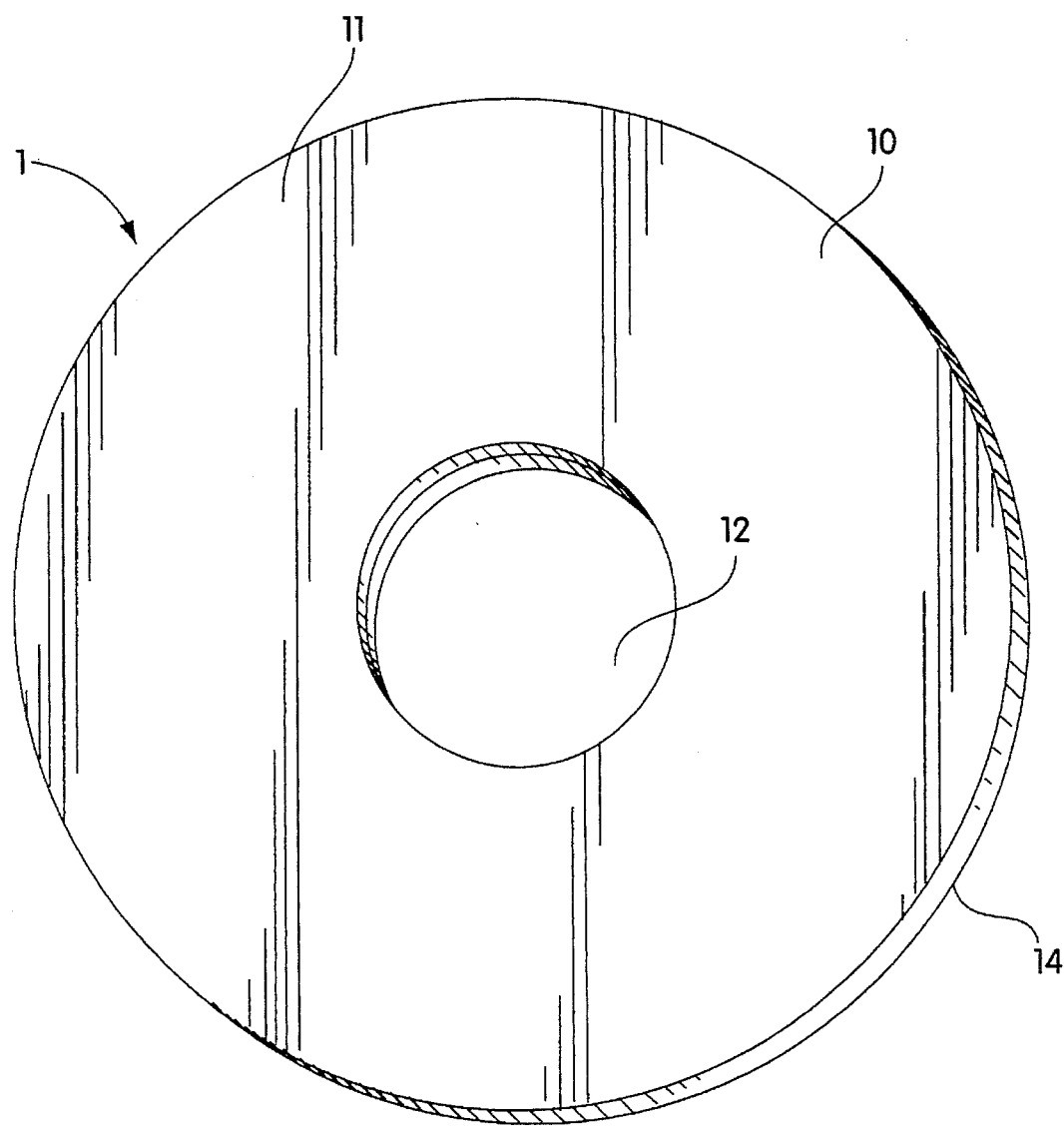
FIG. 1 is a perspective view of the cleaning device of the preferred embodiment of the invention.
Figure 2:
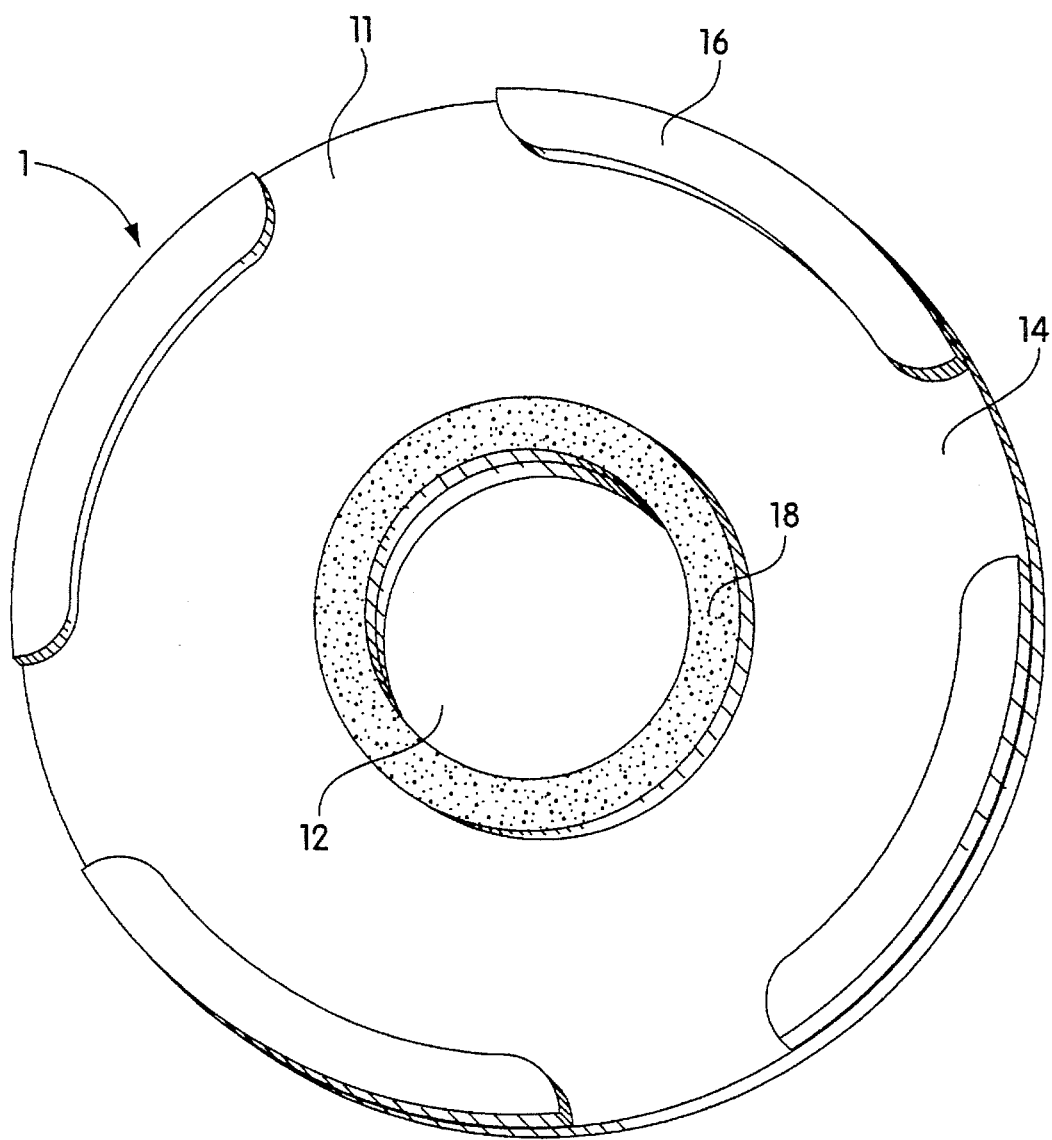
FIG. 2 is a perspective view showing the reverse side of one embodiment of the cleaning device of FIG. 1.
Figure 5:
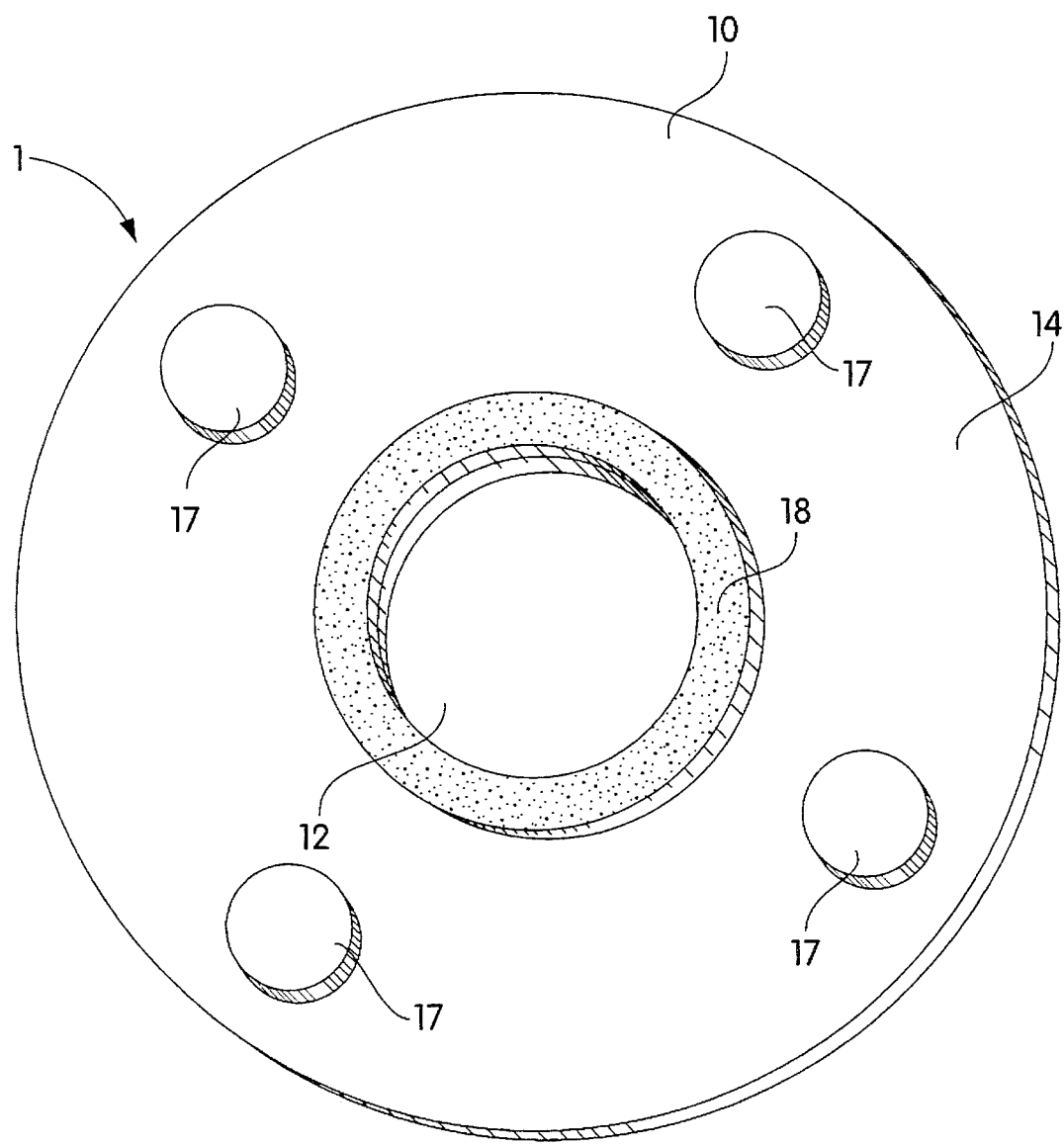
FIG. 5 is a perspective view showing the reverse side of another embodiment of the cleaning device of FIG. 1.

The present invention is a cleaning device for cleaning the laser lens of an optical drive unit. FIGS. 1 and 2 illustrate a preferred embodiment of the cleaning device according to the invention. FIGS. 3 and 4 illustrate the device as inserted into an optical drive unit. FIG. 5 illustrates an alternative embodiment of the cleaning tool.

In the embodiment of the present invention illustrated in FIG. 1, the cleaning device 1 includes a substantially round member 11 preferably of a rigid plastic material, with dimensions allowing seating onto a sliding tray of an optical disc drive unit. For example, when utilized with a compact disc player, member 11 is typically between 4½ to 5 inches in diameter. (A typical compact disc is 4¾ inches in diameter.) The rigid member 11 is provided with a central aperture which is larger than the portion of the drive spindle which projects into the receiving area of the disc drive when the slide tray has been fully retracted. The dimension of the aperture, relative to the spindle, ensures that there is sufficient radial clearance between the activated spindle and the cleaning member so that the member neither is engaged, nor rotated by, the spinning spindle.

FIG. 2 shows a bottom surface 14 of the cleaning device of FIG. 1. A cleaning pad 18 extends from the bottom surface 14 and preferably includes a soft, sticky silicone gel material which attracts and removes dirt and debris upon contact with the laser lens of the optical disc drive unit. Other cleaning materials also are contemplated. For example, a soft fibrous material also would be suitable for application in the present invention. The fibrous material may be constructed of a natural or synthetic fiber which will not scratch the surface of the laser lens even after repeated contact. Particularly where contaminants have been allowed to accumulate for a long period of time, the fibrous cleaning material may be wetted with a cleaning solution prior to insertion of the cleaning tool into the optical disc drive unit. Preferably, the cleaning pad has an adhesive backing which allows the pad to be peeled off and discarded after use, eliminating the risk of redepositing contaminants onto the lens surface during subsequent cleaning.

The cleaning pad 18 is located adjacent the aperture which, on a laser disc, typically is the region where the informational code is provided. With this arrangement, the cleaning material is deployed directly over the initial position of the laser lens. The disc drive unit is preprogrammed to look for the informational code by driving the lens towards and away from the tracts adjacent the central aperture. Consequently, the focusing path of the lens comes directly into contact with the cleaning material which is located where the informational code normally is found. Dust and dirt stick to the silicone gel material and the laser lens is cleaned.

The cleaning material preferably has an annular configuration and is positioned contiguous with the perimeter of the central aperture. The ring shape of the cleaning pad ensures that a portion of the cleaning surface will lie over the laser lens regardless of the orientation of the cleaning member when it is placed by the user in the sliding tray. Alternatively, a small patch of cleaning material may be provided on the cleaning member. However, in the latter arrangement, the user would have to ensure that the member was properly oriented in the sliding tray so that the cleaning material would be aligned with the laser lens.

Risers 16 are provided on the bottom surface of the member to elevate the cleaning material so that the lens only contacts the cleaning material at the end of its upward movement. There is a concern that the drive mechanism for the lens may be damaged if the cleaning material contacts, and prevents further advance, of the lens at an intermediate position. In FIG. 2, the risers 16 include elongated, gently curved projections which follow the margin of the round member. Cylindrical risers are illustrated in FIG. 5. In both arrangements, the risers are integrally formed with the cleaning member. It is contemplated that other configurations of the risers would be suitable for the present invention and that the risers may be independent components which are attached to the member by bonding, ultrasonic welding and other methods which would be apparent to those of skill in the art. To enhance the positioning of the cleaning material relative to the laser lens, the risers and the cleaning material may extend an equivalent distance from the bottom of the cleaning member.

FIG. 4 shows the cleaning device 1 with risers 16 (FIG. 2) resting on the surface of the receiving area 27 within the optical disc drive unit 29. This description also applies to the embodiment of FIG. 5. The risers 16 keep the cleaning device 1 stable while providing clearance for the cleaning pad 18. The centrally located aperture 12 is larger than the drive spindle 20 which allows the drive spindle 20 to spin freely when activated while the cleaning device 1 remains stationary. When the optical disc drive unit 29 is activated, a laser head 23 moves vertically up and down in an attempt to focus a laser lens 22 on an imprinted code such as is commonly found on a laser disc. The vertical movement of the laser head 23 forces the cleaning pad 18 to contact the surface of the laser lens 22. Dirt and debris become attached to the sticky surface of the soft silicone gel on the cleaning pad 18, or embedded in the bristles when a fibrous cleaning pad is employed, and are removed from the surface of the laser lens.

It will be appreciated that, while the cleaning device has been described for cleaning the laser lens of an optical disc drive unit, with appropriate shape modifications it could be used for cleaning any disc drive unit, including audio and video devices.

It should be understood that the foregoing description of the invention is intended merely to be illustrative having been presented by way of example only. Numerous other embodiments and modifications may be apparent to those of skill in the art, and are intended to be within the scope of the present invention as defined by the appended claims.

What is claimed is:

1. A combination comprising an optical disc drive unit and a cleaning device for cleaning a laser lens of said optical disc drive unit, said optical disc drive unit having a receiving area and a drive spindle which extends into said receiving area;

said cleaning device including a member adapted for insertion into said receiving area of said optical disc drive unit and cleaning means supported by said member for cleaning said laser lens of said optical disc drive unit;

said member having an aperture extending therethrough, said aperture being constructed and designed to provide sufficient radial clearance about said drive spindle of said optical disc drive unit, which extends through at least a portion of said aperture when said member is fully inserted within said receiving area of said disc drive unit but does not engage nor otherwise contact said cleaning device, allowing said member and said cleaning means to remain stationary while said spindle is rotated;

wherein said laser lens moves upwardly and downwardly during a focusing sequence so as to contact said cleaning means, causing dust and contaminants to be removed therefrom; and said cleaning means surrounds said aperture.

2. The cleaning device of claim 1 wherein said member is rigid.

3. The cleaning device of claim 1 wherein said cleaning means is removably supported by said member.

4. The cleaning device of claim 1 wherein said cleaning means is contiguous with the perimeter of said aperture.

5. The cleaning device of claim 1, further comprising:

a plurality of risers extending in spaced relationship from said member.

6. The cleaning device recited in claim 5 wherein said member includes a flat, level surface and wherein each of said plurality of risers and said cleaning material extend a substantially similar distance from said flat, level surface.

7. The cleaning device recited in claim 6 wherein said member is round and said plurality of spaced risers have an elongated curved configuration.

8. The cleaning device recited in claim 7 wherein said plurality of elongated curved risers are positioned along the margin of said round member.

9. The cleaning device recited in claim 5 wherein said plurality of risers have a cylindrical configuration.

10. A combination comprising an optical disc drive unit and a cleaning device for cleaning a lens of said optical disc drive unit, said optical disc drive unit having a receiving area and a drive spindle which extends into said receiving area;

said cleaning device including a substantially round, rigid member adapted for insertion into said receiving area of said optical disc drive unit and having an aperture which is larger than said spindle of said disc drive unit, said spindle extending through at least a portion of said aperture when said substantially rigid member is fully inserted within said receiving area of the disc drive unit but not engaging nor otherwise contacting said cleaning device, wherein said member and said cleaning means remain stationary when said spindle is rotated;

an annular cleaning material extending from said substantially round, rigid member and being positioned contiguous with the perimeter of said aperture; and a plurality of risers extending from said substantially round, rigid member;

wherein said laser lens moves upwardly and downwardly during a focusing sequence so as to contact said cleaning material, causing dust and contaminants to be removed therefrom; and said cleaning means surrounds said aperture.

\* \* \* \* \*